United States Patent [19]
Bourque et al.

[11] Patent Number: 5,986,277
[45] Date of Patent: Nov. 16, 1999

[54] METHOD AND APPARATUS FOR ON-LINE MONITORING THE TEMPERATURE AND VELOCITY OF THERMALLY SPRAYED PARTICLES

[75] Inventors: Gilles Bourque, Châteauguay; Mario Lamontagne, Varennes; Christian Moreau, Boucherville, all of Canada

[73] Assignee: National Research Council of Canada, Ottawa, Canada

[21] Appl. No.: 08/960,206

[22] Filed: Oct. 29, 1997

[51] Int. Cl.⁶ .............................. G01J 5/08; G01N 21/15
[52] U.S. Cl. ............................ 250/554; 356/43; 356/338
[58] Field of Search ........................ 250/222.2, 227.11, 250/554, 342, 349; 356/43, 44, 338, 28

[56] References Cited

U.S. PATENT DOCUMENTS

| | | |
|---|---|---|
| 4,517,845 | 5/1985 | Ransheim et al. . |
| 4,568,183 | 2/1986 | Douglas .................................... 356/43 |
| 4,656,331 | 4/1987 | Lillquist et al. . |
| 4,840,486 | 6/1989 | Schodl ..................................... 356/338 |
| 5,180,921 | 1/1993 | Moreau et al. . |
| 5,317,165 | 5/1994 | Montagna . |
| 5,495,112 | 2/1996 | Maloney et al. . |

FOREIGN PATENT DOCUMENTS 24 01 322A1  7/1975  Germany .

Primary Examiner—Stephone Allen
Attorney, Agent, or Firm—Neil Teitelbaum & Associates

[57] ABSTRACT

A method and an apparatus for monitoring simultaneously the temperature and velocity of a thermal spray jet. The apparatus has a sensor head directed at the jet, the sensor head having two optical fibers carrying radiation from the jet to a remote detection unit which comprises two or three photodetectors. The radiation carried by the separate optical fibers is filtered at two different wavelengths before being passed to the photodetectors. The temperature of the jet is determined by analyzing the ratio of the energy radiated at the two wavelengths. The velocity of the jet is determined, knowing the distance between the fibers, by measuring the time delay between the signals carried by the separate fibers using cross-correlation.

12 Claims, 3 Drawing Sheets

METHOD AND APPARATUS FOR ON-LINE MONITORING THE TEMPERATURE AND VELOCITY OF THERMALLY SPRAYED PARTICLES

FIELD OF THE INVENTION

This invention relates to optical sensors for use in thermal spraying processes and in particular, in plasma spray processes, to monitor on-line certain characteristics of the thermally sprayed particles in the spray jet.

BACKGROUND OF THE INVENTION

Thermal spraying in general, and plasma spraying in particular, is a powerful technique widely used to produce protective coatings on a large variety of substrates. For example, thermal barrier coatings are plasma sprayed in producing aircraft engines, and ceramic and metal coatings are thermally sprayed for various purposes. Coating properties depend upon many spraying parameters, some of them being related to the spray gun operation. Consequently, spraying process control has been implemented by monitoring and regulating gun input variables as arc current and power, arc gas flow rates, powder feed rate and powder gas pressure, to keep them at predetermined optimum values. This control approach is quite complex because a large number of interrelated input variables must be monitored, while some variables, such as electrode wear, cannot be monitored at all.

On-line measurement of the variables which directly influence the structure of thermally sprayed coatings, can provide an efficient feedback for the setting of the spray gun parameters and a diagnostic tool to detect any problems during the coating operation.

It is well known to those skilled in the art that thermal spraying denotes a number of techniques besides plasma spraying, e.g. arc spraying, HVOF and flame spraying.

Collecting information about hot particle flow may also be useful in other applications, e.g. in the production of metallic powders by gas atomization.

Two types of techniques are available to perform an in-flight particle velocity measurement. In the first type, the velocity information is obtained from light impinging upon and reflected by the particles and then detected by an appropriate sensor. Laser based techniques, such as laser Doppler anemometry and laser dual focus velocimetry, are included in this first type of techniques. They use intense laser light beams to form interference fringes, or use two focused light beams in the measurement region. When the particle trajectory intercepts the measurement region, the reflected light intensity is modulated as the particle travels through the intensely illuminated zones and the velocity is computed from the modulation period. Periodic light distributions may also be obtained using a high intensity incandescent source and a Ronchi grating. This technique is not attractive as being bulky and requiring high intensity light sources.

In patents DE 2401322 and EP 150658, a source of light is guided by a bundle of optical fibers to the jet stream from which the reflected light is transmitted back by two other optical fibers and captured by two detectors. The velocity is obtained from the fiber spacing and by calculating the time delay by cross-correlation. Since the system uses reflected light, it is limited to a very small measuring volume and the sensor must be relatively close to the jet which may cause heating problems in thermal spray processes. Secondly, no information can be obtained concerning the temperature of the jet.

The second type of techniques used to perform the velocity measurement takes advantage of the thermal radiation emitted by the particles heated to a high temperature by the plasma or other heat source such as HVOF. The radiation emitted by individual particles is detected when the particles pass through the detector field of view of known dimensions. The transit time is evaluated and the velocity is computed knowing the travel length. Since the dimensions of the field of view change with the distance from the optical detection assembly, it is necessary to analyze only particles near the assembly focal plane. To do that, a laser beam or a second detection assembly focused in the appropriate region from a different angle must be used in conjunction with a coincidence detection analysis system. Such a system is complex and difficult to keep well aligned under practical operating conditions. In this same type of techniques, velocity measurements can also be performed using high speed cameras. In this case, light emitted by the particles is used to image them on a high speed film and, from these images the particle velocity is determined. Such a system can be used for laboratory investigation, but it is not suitable for real time operation in the harsh thermal-spray environment.

A somewhat similar velocity measurement apparatus using two wide angle radiation detectors is described in PCT patent application WO 834437. A timing electronic circuit is used to determine the time delay between the detectors. However, the signal processing scheme is restricted to slowly moving material because of its start-stop configuration. No temperature information can be obtained from that apparatus.

A thermal radiation signal from hot gas jet was used to measure velocity by cross-correlation technique (See G. J. Liewellyn, Acta Imeko London (1976), 351–357 and P. J. Webb, Acta Imeko London (1976), 327–336). Again no information was extracted concerning the temperature of the gas jet, even though temperature measurement was performed with one wavelength pyrometry technique using a different apparatus in the publication by Webb.

U.S. Pat. No. 5,180,921 issued to Moreau et al. describes a control approach in which the temperature and velocity of the sprayed particles are monitored before their impingement on the substrate. The system of Moreau et al. has a sensor head attached to the spray gun, an optical fibre transmitting the collected radiation to a detection apparatus which incorporates two photodetectors. A two-slit mask is located in the sensor head at the end of the optical fibre. For temperature measurements, the radiation emitted by the particles and collected by the sensor head is transmitted to the photodetectors, filtered by interference filters at two adjacent wavelengths. The particle temperature may be computed from the ratio of the detector outputs. To measure the velocity, the two-slit system collects radiation emitted by the in-flight particles tracelling in the sensor field-of-view, which generates a double-peak light pulse transmitted through the optical fibre. The time delay between these two peaks may be evaluated automatically and the particle velocity computed knowing the distance between the two slits.

In conclusion, except for the Moreau U.S. Pat. No. 5,180,921 in certain conditions, none of the above mentioned systems are capable of or adapted for simultaneous measurements of both velocity and temperature in typical industrial thermal spray environment.

While the system of the Moreau et al. patent is useful, the system is designed to measure accurately the temperature and velocity of individual particles. Consequently, the measuring volume is small and the number of particles in that volume per unit time is also limited. Due to the small measuring volume, in order to obtain an average picture, the jet must be divided into many smaller regions. This can make the analysis unduly lengthy. The fact that the number of particles in the measuring volume is limited, imposes a maximum powder feed rate, on the order of 5 kg per hour, which can still be analyzed accurately.

U.S. Pat. No. 5,317,165 to Montagna describes an apparatus which uses two fiber bundles to determine electromagnetic radiation emitted by the flame of a burner. The apparatus serves to detect the presence and quality of the flame.

U.S. Pat. No. 5,654,797 to Moreau et al. is concerned with the evaluation of the diameter of thermally sprayed particles.

Other systems and methods for detecting, measuring or monitoring temperature or velocity of in-flight particles are described in PCT application No. WO 834,437; DE 2,401, 322; EP 150,658; Swancke et al., Proceedings of the 8th National Spray Conference 111–116 (Sep. 1995); Mishin et al., J. Phys. E. Sci. Instrum., 20 (1987) 620–5; and U.S. Pat. No. 4,656,331 to Lillquist. The various known techniques to perform the measurements of the properties of in-flight particles are discussed in the above-cited U.S. Pat. No. 5,180,921 the specification of which is being incorporated herewith by reference.

It is an object of the present invention to provide a method and apparatus for monitoring certain characteristics, and particularly temperature and velocity of thermally sprayed particles in a plasma jet during flight between a thermal jet source, e.g. a plasma gun, and a substrate.

It is another object of the invention to provide a method and apparatus as defined above, enabling the extension of prior art methods to higher powder feed rates and to lower temperatures, while being relatively simple and easy to operate.

SUMMARY OF THE INVENTION

In accordance with the invention, a method is provided for detecting certain characteristics of thermally sprayed particles by detecting in-flight the thermal radiation of a stream of the particles, the method comprising the steps of:

focusing radiation emitted from a region of the stream of particles on a first photodetector through a first optical waveguide and on a second photodetector through a second optical waveguide, and transmitting signals from the photodetectors to a processor for determining the velocity of the stream of particles in the region from time delay between the respective signals transmitted from said photodetectors, the first optical waveguide and the second optical waveguide having each a first end and a second end and being disposed such that their respective first ends are effectively aligned substantially in the direction of the stream of particles.

The alignment of the inlet ends of the waveguides need not be physically parallel to the direction of the stream as long as the fields of view of the respective first ends of the waveguides are aligned with the direction of the stream, or alternatively, as long as the waveguides receive radiation from an upstream location of the stream and a downstream location on the stream respectively.

The method further comprises the steps of:

filtering the radiation from the first and second optical waveguide at separate first and second adjacent wavelengths, passing the first wavelength and the second wavelength to the first and second photodetector respectively, and determining the temperature of the region of the stream from the ratio of the signals.

The apparatus of the invention comprises a first and a second optical waveguide each having a first end and a second end, for carrying radiation emitted by a region of a stream of thermally sprayed particles to a first photodetector and a second photodetector, optical means for focusing radiation from the region of a stream of thermally sprayed particles on the first ends of the first optical waveguide and of the second optical waveguide, and a pair of photodetectors for receiving the radiation from the first and second optical waveguide respectively.

The apparatus further comprises two filtering means each respectively disposed between a second end of one of the waveguides and the corresponding photodetector, for filtering the radiation carried by the two optical waveguides at two different wavelengths.

BRIEF DESCRIPTION OF THE DRAWINGS

Exemplary embodiments of the invention will now be described in conjunction with the drawings, in which.

DESCRIPTION OF THE INVENTION

The present invention is a method and apparatus for monitoring simultaneously the temperature and velocity of the sprayed particles by detecting in flight their thermal radiation. The monitoring system consists of a sensor head located near the torch, and a detection box containing the photodetectors.

Figure 1:
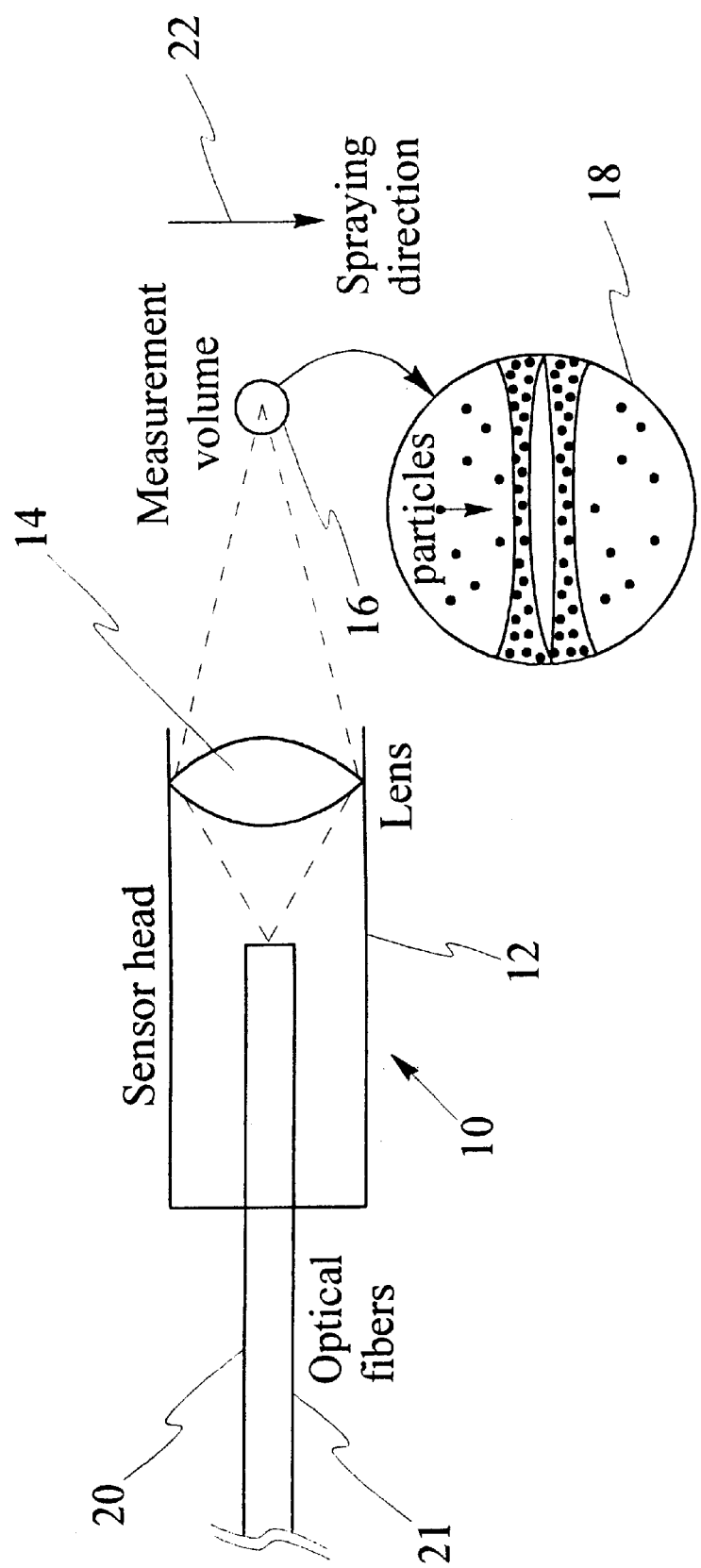
FIG. 1 is a schematic sectional view of a sensor head in accordance with the invention and the field of view of the sensor.

FIG. 1 shows a schematic of the sensor head and the corresponding field of view of the detection optics. The sensor head 10 has a casing 12 with a lens 14 and is situated such as to receive radiation from a selected measurement region or volume 16. The field of view of the sensor is illustrated in the circle 18.

Optical waveguides in the form of two optical fibers 20, 21 are mounted in the sensor head 10 such that their first ends face the lens while their second ends are disposed at the detection unit. The first ends of the fibers are aligned in the direction of the spray as illustrated by an arrow 22. The diameter of the fibers is selected in dependence on the desired spacing of the first ends, taking into account the thickness of the claddings. Preferably, fibers with 200 $\mu$m core diameter are used, but the diameter may be as small as 25 and as large as 500 $\mu$m.

The radiation collected by the sensor head 10 is sent to the detection box (FIG. 2a) through the optical fibers 20, 21. The sensor head 10 is disposed in the proximity of the plasma gun 24, with the lens directed at the selected measurement region 16 of the plasma jet 26.

Figure 2A:
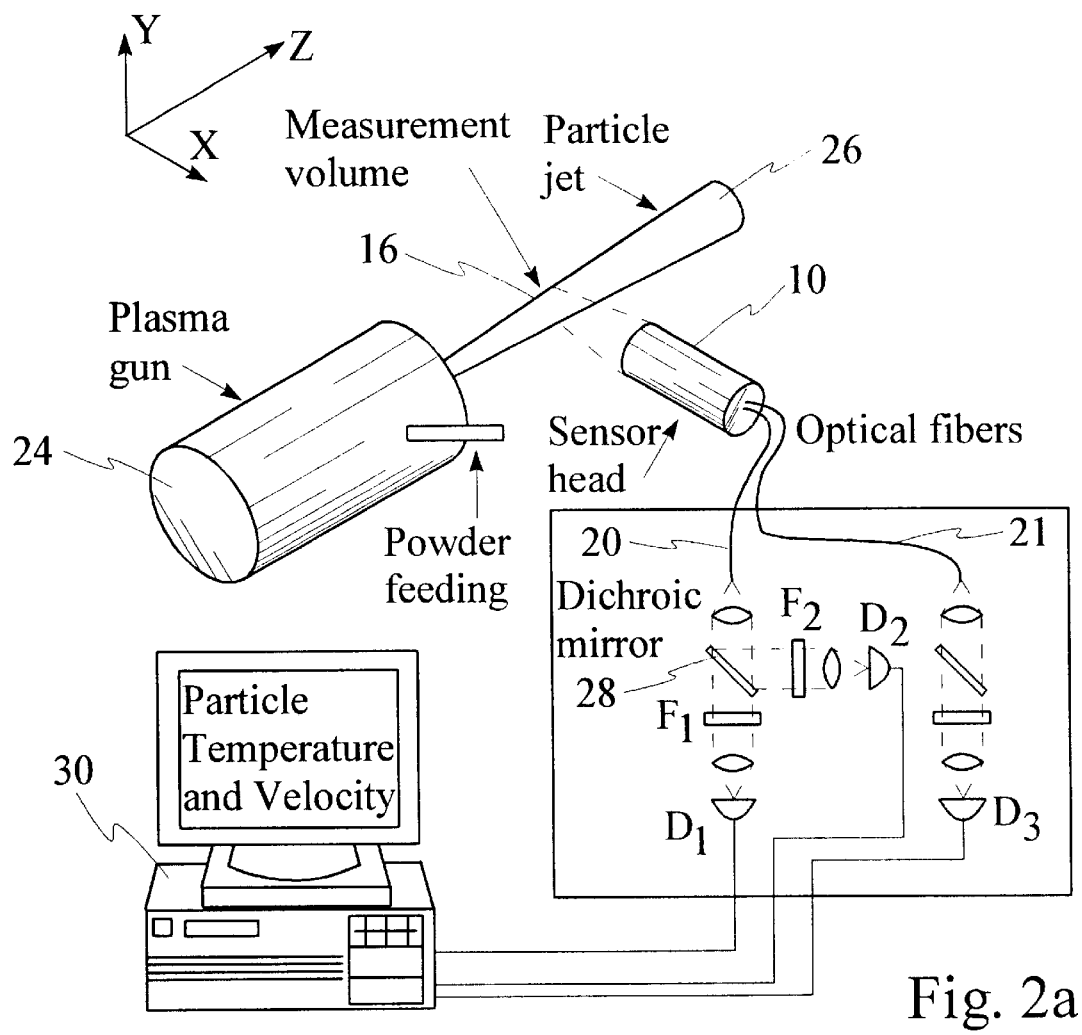
FIG. 2a is a schematic view of the apparatus of the invention including the sensor head, the detection unit and a computer.
Figure 2B:
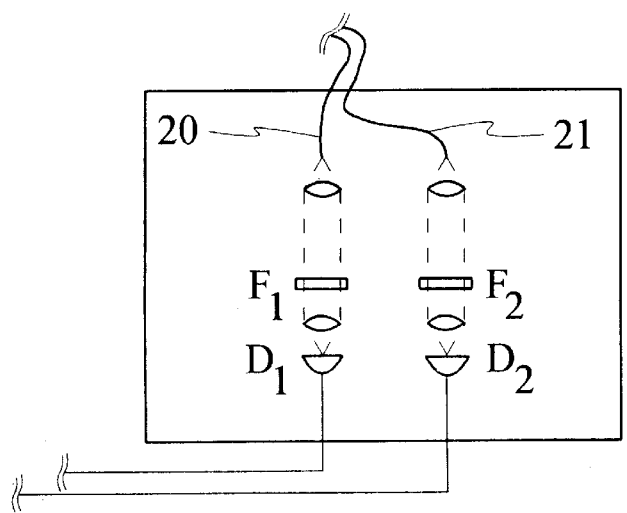
FIG. 2b is a schematic illustration of an alternative detection unit.

The detection box in FIG. 2a contains three photodetectors D1, D2 and D3. An alternative design of the detection unit, illustrated in FIG. 2b employs two photodetectors D1 and D2. In the three detector embodiment shown in FIG. 2a, temperature is measured using information provided from detectors D1 and D2, and velocity is measured by using information provided by detectors D1 and D3. Thus, the collected radiation can be analyzed in two ways. In the first case, illustrated in FIG. 2a, the radiation transmitted from the first fiber (second end) is passed through a lens and is spectrally separated by a wavelength dependent beam splitter in the form of a dichroic mirror 28 and then filtered by two bandpass filters $F_1$ and $F_2$. In the second case, illustrated in FIG. 2a, the collected radiation from each fiber is filtered separately at a different wavelength. This eliminates the use of the dichroic mirror and of a third detector thus minimizing the cost of the system. The wavelengths are selected in order to minimize the influence of the plasma radiation scattered by the particles. Signals from both detectors are amplified and fed to a digitizing board, not illustrated. Digitized signals are analyzed by a personal computer 30 that calculates the temperature and velocity of the in-flight particles as described below.

The signals measured by the detectors D1 and D2 (see FIG. 2a and FIG. 3) do not have to be dissected to identify individual velocity and temperature of a single particle. Rather, the correlation integral (equation 1 below) will be at the maximum when the signal D1 is shifted in time by an amount $\tau^*$ (tau*) corresponding to the average transit time between the two fibers of all the particles present in the signal buffer, regardless of the number of particles. For the temperature, both signals are integrated on the entire buffer length, regardless of the number of particles pressent, and the average temperature can be calculated from the ratio of these integrals and from equation (5). It will be appreciated that both these computations can be made in a straightforward manner using standard electronic hardware components, not necessarily a computer.

Figure 3:
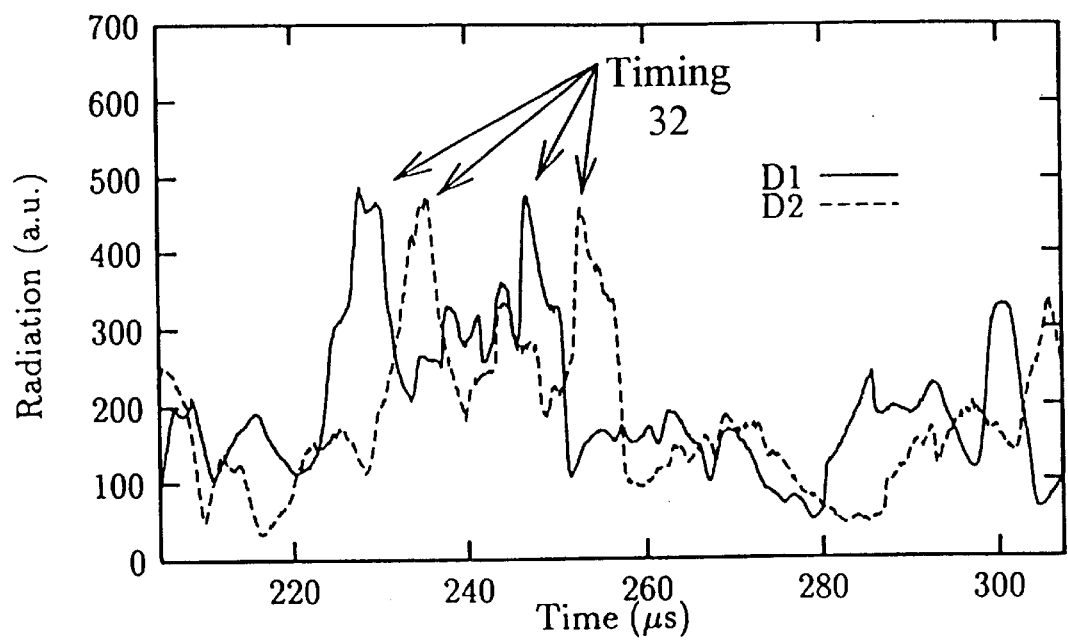
FIG. 3 represents an exemplary graph of signals collected by the detection unit.
Figure 4:
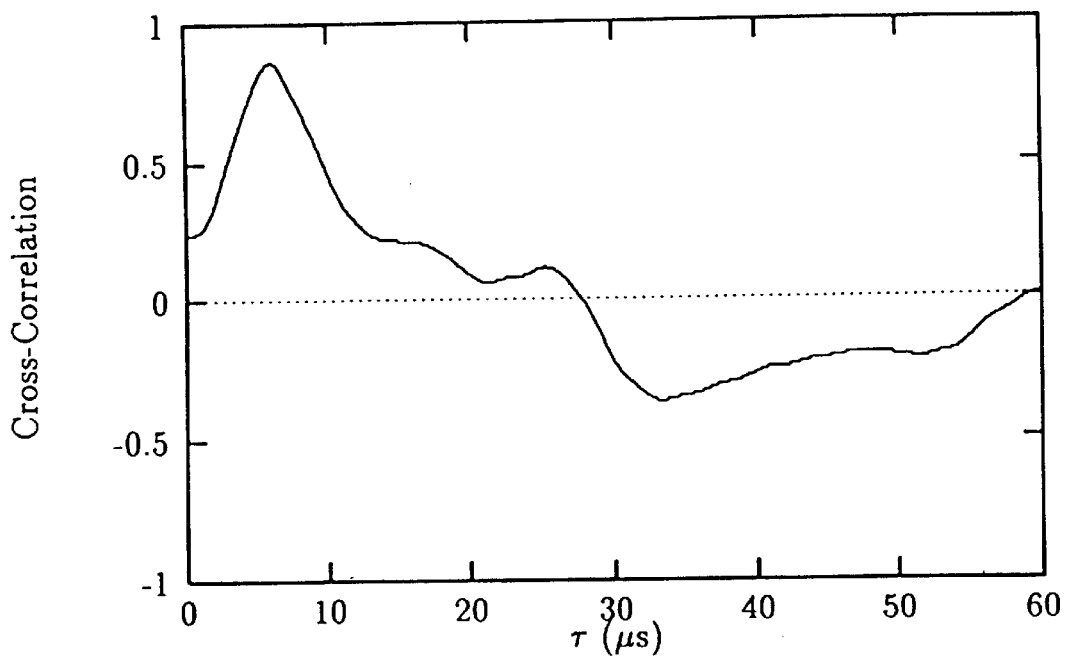
FIG. 4 is a cross-correlation graph derived from the graph of FIG. 3.

As discussed above, the sensor head is located in front of the spray unit in a way that the first ends of the two optical fibers 20, 21, proximate the lens 14, are aligned in the direction of spraying (FIG. 1). Due to the granular nature of the jet, the intensity of emitted light fluctuates randomly with time (see FIG. 3). Indeed, the jet is made of many particles of different size, temperature and velocity. These inherent irregularities are used as timing reference marks 32. Consequently the signal seen in the fiber downstream, $D_2$ (t) (or $D_3$ (t) in the three detectors configuration), is delayed compared to the signal in the upstream fiber $D_1$(t). By using the cross-correlation calculation defined by:

Equation 1

$$R_{12}(\tau) = \frac{1}{T} \int_0^T D_1(t+\tau)D_2(t)dt$$

the delay $\tau^*$ is obtained with the value of that maximizes the function $R_{12}$. The result of the calculation for the signals shown in FIG. 3 is given in FIG. 4 in which the sharp peak represents a delay of 6 $\mu$sec. Knowing the distance d between the fibers, taking into account the optical magnification M, the average velocity of the particles which generated the signals can be calculated from:

$$\overline{v} = \frac{dM}{\tau^*}$$

The distance d separating the optical fibers and the acquisition sampling time $\Delta t$ are related to the resolution of the velocity measurement by the following formula:

$$\frac{\Delta v}{v} = \pm \frac{\Delta t v}{2d}$$

Thus, for 10% resolution at v=200 m/s velocity, using a sampling time $\Delta t=1$ $\mu$s and an optical magnification m=3, the travel length is of the order of 333 $\mu$m. Accumulation data and use of statistics can rapidly decrease the uncertainty below 1%. Conventional low cost electronics and optics can therefore be used for the setup.

The temperature T of the jet of particles is obtained by the two color pyrometry technique. It is given by the ratio of the energy radiated at two wavelengths $\lambda_1$ and $\lambda_2$ according to Planck's law:

$$R = \frac{\varepsilon_{\lambda_1}}{\varepsilon_{\lambda_2}}\left(\frac{\lambda_2}{\lambda_1}\right)^{-5} \exp\left[-\frac{C_2}{T}\left(\frac{1}{\lambda_1} - \frac{1}{\lambda_2}\right)\right]$$

where $C_2$=1,4388 cmK is a constant and $\epsilon_\lambda$ is the spectral emissivity. The wavelengths are selected in order to minimize the influence of the plasma radiation scattered of the particles. For the temperature range of interest (1000K–3500K), and for the chosen wavelengths, this relation can be approximated, with the assumption of gray body, by the following equation:

$$T = A + B\left(\frac{\overline{D_1}}{\overline{D_2}}\right)$$

where $\overline{D_1}$ and $\overline{D_2}$ are the average signals in the detectors $\overline{D_1}$ and $\overline{D_2}$, A and B are calibration constants. The calibration can be done with the use of a tungsten ribbon lamp.

The preferred spacing d is of the order of 250 $\mu$m but it can be as large as 1000 $\mu$m or as small as 50 $\mu$m. The separation d should not be too large in order to keep a good level of coherence between the two signals. The lower limit is imposed by the optical fiber diameter and by the need of much higher speed electronics for the acquisition.

Note that the cross-sectional surface of the core optical fibers is much bigger than the size of the slit mask of the Moreau patent U.S. Pat. No. 5,180,921, thus permitting to capture a greater quantity of light emitted simultaneously by many particles, which gives a better sensitivity at lower temperatures. Also, the measuring volume and consequently the field of view are larger in the instant invention. Consequently, a much larger portion of the jet of particles is sensed in both the X and Y directions (FIG. 2a), allowing an average (representative) picture of the jet with a single measurement. The system of the invention therefore does not require a sophisticated and precise procedure to align the sensor head relative to the center of the jet.

It is a feature of the invention that both velocity and temperature can be determined from the same signals. Since the correlation equation Equation 1 requires only that the signals be of similar shape and is insensitive to the relative amplitude, and since for the average particle temperature measurement only the integral over the observation periods of both signals is needed, both calculations can be performed independently and simultaneously on the same signals. Appropriate bandpass filtering is however a prerequisite to prevent torch movement, noise and spurious reflection from corrupting the calculation. A simple FFT algorithm or analog hardware circuitry removing the DC component and the high frequency associated with the noise is sufficient and therefore quite fast even with low cost electronics.

One of the advantages of the invention is its simplicity since it does not require any intense light sources or second detection assembly. This results in a more compact, rugged and easy-to-use sensor that doesn't require special eye protection. The system requires only two photodetectors (in the minimal configuration) for the temperature and velocity measurements avoiding use of coincidence electronic devices and the delicate alignment of a second detection assembly or light beam in the particle jet. Also, since no attempt is made to isolate individually the particle but rather only an average temperature and velocity is sought this makes the requirements for the electronic and optical hardware less stringent resulting in a lower cost system with a fast response time. It will be recognized that while the solution of the Moreau '921 patent was suitable for powder feed rates of up to about 5 kg per hour, the present system is suitable for rates up to 50–75 kg per hour that are feasible with thermal spray torches of today.

Since the system and method of the invention enables the determination of average velocity and temperature of the jet, and since a measurement of the absolute intensity of radiation emitted is available, the invention makes it possible also to evaluate the yield, or at least a yield change during the deposition.

Finally, no sophisticated and time consuming software is needed to interpret the data, making this system capable of working in real-time as part of a feedback system for on-line process control in industrial environments.

What is claimed is:

1. A method of detecting certain characteristics of thermally sprayed particles by detecting in-flight the thermal radiation of a stream of the particles, the method comprising the steps of:

focusing radiation emitted from a region of the stream of particles on a first photodetector through a first optical waveguide and on a second photodetector through a second optical waveguide, and transmitting signal information from the photodetectors to a processor for determining the velocity of the stream of particles in the region from time delay between the respective average signals transmitted from said photodetectors, the first optical waveguide and the second optical waveguide having each a first end and a second end and being disposed such that their respective first ends are effectively aligned substantially in the direction of the stream of particles.

2. The method according to claim 1 further comprising the steps of:

filtering the radiation from the first and second optical waveguide at separate first and second wavelengths, passing the signal of the first wavelength and the signal of the second wavelength to the first and second photodetector respectively, integrating the signals from said photodetectors, and determining the temperature of the region of the stream from the ratio of the intensity of the respective integrated signals.

3. The method of claim 1 wherein said average signals are obtained by integration over a predetermined period of time.

4. The method of claim 2 wherein said focusing step includes passing radiation from said first optical fiber through a lens and via a dichroic mirror and through separate filters to said first photodetector and to a third photodetector.

5. An apparatus for determining characteristics of a stream of thermally sprayed particles, the apparatus comprising a first and a second optical waveguide each having a first end and a second end, for carrying radiation emitted by a region of the stream of thermally sprayed particles, optical means for focusing radiation from the region of a stream of thermally sprayed particles on the first ends of the first optical waveguide and of the second optical waveguide, and a pair of photodetectors for receiving the radiation from the first and second optical waveguide respectively.

6. The apparatus of claim 5, further comprising two filtering means each respectively disposed between the second end of one of the waveguides and the corresponding photodetector, for filtering the radiation carried by the two optical waveguides at two different wavelengths.

7. The apparatus of claim 6 wherein said different wavelengths are adjacent wavelengths selected to minimize the influence of the scattered radiation of the particles.

8. The apparatus of claim 5 further comprising optical means for splitting radiation emitted from the second end of the first optical fiber and a third photodetector for receiving a part of the split radiation.

9. The apparatus of claim 8 wherein the splitting optical means is a dichroic mirror.

10. The apparatus of claim 5 further comprising processing means for determining a delay between the signals transmitted by said first fiber and said second fiber, and for calculating the average velocity of said stream based on said delay and a spacing between said first ends of said fibers.

11. The apparatus of claim 5 further comprising processing means for determining a temperature of said stream based on the ratio of the signals transmitted by said first fiber and said second fiber.

12. A method of detecting certain characteristics of thermally sprayed particles by detecting in-flight the thermal radiation of a stream of the particles, the method comprising the steps of:

focusing radiation emitted from a region of the stream of particles on a first photodetector through a first optical waveguide and on a second photodetector through a second optical waveguide, and transmitting signal information from the photodetectors to a processor for determining the velocity of the stream of particles in the region from time delay between the respective average signals transmitted from said photodetectors, the first optical waveguide and the second optical waveguide having each a first end and a second end and being disposed such that their respective first ends are effectively aligned to receive light corresponding to an image of a stream of particles at different locations.

* * * * *